(12) United States Patent
Vassallo et al.

(10) Patent No.: US 10,132,262 B2
(45) Date of Patent: Nov. 20, 2018

(54) METHODS FOR OPTIMIZING EXHAUST GAS SYSTEM REGENERATION AND CLEANING

(71) Applicant: GM GLOBAL TECHNOLOGY OPERATIONS LLC, Detroit, MI (US)

(72) Inventors: Alberto Lorenzo Vassallo, Turin (IT); Claudio Cortassa, Rosta (IT); Denise Risso, Savigliano (IT); Luca Giuseppe Pairolero, Rivoli (IT)

( * ) Notice: Subject to any disclaimer, the term of this patent is extended or adjusted under 35 U.S.C. 154(b) by 113 days.

(21) Appl. No.: 15/341,366

(22) Filed: Nov. 2, 2016

(65) Prior Publication Data

US 2018/0119631 A1    May 3, 2018

(51) Int. Cl.
| | | |
|---|---|---|
| *F01N 3/021* | (2006.01) | |
| *F02D 41/22* | (2006.01) | |
| *F01N 9/00* | (2006.01) | |
| *F01N 13/00* | (2010.01) | |
| *F02D 41/02* | (2006.01) | |
| *F02D 41/40* | (2006.01) | |
| *F01N 11/00* | (2006.01) | |
| *F02D 41/14* | (2006.01) | |

(52) U.S. Cl.
CPC .......... *F02D 41/222* (2013.01); *F01N 3/021* (2013.01); *F01N 9/002* (2013.01); *F01N 9/005* (2013.01); *F01N 11/00* (2013.01); *F01N 13/008* (2013.01); *F02D 41/029* (2013.01); *F02D 41/405* (2013.01); *F01N 2340/06* (2013.01); *F01N 2560/05* (2013.01); *F01N 2560/20* (2013.01); *F01N 2900/1606* (2013.01); *F02D 41/1441* (2013.01); *F02D 41/1463* (2013.01); *F02D 41/1495* (2013.01); *F02D 2200/0812* (2013.01)

(58) Field of Classification Search
CPC .... F02D 41/222; F02D 41/029; F02D 41/405; F01N 3/021; F01N 9/005; F01N 13/008; F01N 2560/20
See application file for complete search history.

(56) References Cited

U.S. PATENT DOCUMENTS

| | | | |
|---|---|---|---|
| 2006/0107730 A1* | 5/2006 | Schumann | F01N 3/023 73/1.06 |
| 2008/0000286 A1* | 1/2008 | Strohmaier | F02D 41/1466 73/23.21 |
| 2008/0053067 A1* | 3/2008 | Schmidt | F01N 11/00 60/276 |
| 2008/0295491 A1* | 12/2008 | Kuboshima | F01M 1/18 60/285 |

(Continued)

*Primary Examiner* — Patrick Maines

(57) ABSTRACT

Methods for optimizing exhaust gas system regeneration and cleaning are provided. The exhaust gas system can include an exhaust gas stream supplied by an exhaust gas source to a particulate filter device through an exhaust gas conduit, and a gas sensor having a sampling end disposed within the exhaust gas conduit upstream from the particulate filter device. The methods can include detecting a gas sensor malfunction, detecting particulate filter device soot loading, and performing an optimized maintenance utilizing at least one common technique. A common technique is one which is capable of cleaning a gas sensor and regenerating a PF device. The exhaust gas source can comprise an internal combustion engine and the at least one common technique comprises a post-injection strategy. Systems for performing the disclosed methods are also provided.

20 Claims, 2 Drawing Sheets

(56) References Cited

U.S. PATENT DOCUMENTS

| | | | |
|---|---|---|---|
| 2011/0048106 A1* | 3/2011 | Zawacki | F02D 41/1494 |
| | | | 73/28.01 |
| 2012/0186230 A1* | 7/2012 | Yahata | F02D 41/1466 |
| | | | 60/274 |
| 2012/0227377 A1* | 9/2012 | Hopka | F02D 41/222 |
| | | | 60/274 |
| 2014/0150406 A1* | 6/2014 | Goodwin | F01N 11/00 |
| | | | 60/274 |

* cited by examiner

METHODS FOR OPTIMIZING EXHAUST GAS SYSTEM REGENERATION AND CLEANING

INTRODUCTION

During a combustion cycle of an internal combustion engine (ICE), air/fuel mixtures are provided to cylinders of the ICE. The air/fuel mixtures are compressed and/or ignited and combusted to provide output torque. After combustion, pistons of the ICE force exhaust gases in the cylinders out through exhaust valve openings and into an exhaust system. The exhaust gas emitted from an ICE, particularly a diesel engine, is a heterogeneous mixture that contains gaseous emissions such as carbon monoxide (CO), unburned hydrocarbons, oxides of nitrogen ($NO_x$), and oxides of sulfur ($SO_x$), as well as condensed phase materials (liquids and solids) that constitute particulate matter. Liquids can include water and hydrocarbons, for example.

Exhaust gas treatment systems may employ filter and catalyst devices configured for accomplishing an after-treatment process such as reducing $NO_x$ to produce more tolerable exhaust constituents of nitrogen ($N_2$) and water ($H_2O$), or trapping particulate matter. Exhaust gas treatment systems also employ sensors in order to monitor the gaseous concentrations within the exhaust gas stream and the performance of catalytic components and exhaust filters. Gas sensors include a sampling end located within the exhaust system comprising sampling orifices through which a gas sample can be collected. Due to the presence of soot and particulate matter within the exhaust gas, these sampling holes and/or gas paths within the sensor can become clogged and prevent accurate monitoring of the exhaust gas and treatment system devices.

SUMMARY

According to an aspect of an exemplary embodiment, a method for optimizing exhaust gas system regeneration and cleaning is provided. The exhaust gas system can include an exhaust gas stream supplied by an exhaust gas source to a particulate filter device through an exhaust gas conduit, and a gas sensor having a sampling end disposed within the exhaust gas conduit upstream from the particulate filter device. The methods can include detecting a gas sensor malfunction, detecting particulate filter device soot loading, and performing an optimized maintenance utilizing at least one common technique. A common technique is one which is capable of cleaning a gas sensor and regenerating a PF device. The exhaust gas source can comprise an internal combustion engine and the at least one common technique comprises a post-injection strategy. The exhaust gas system can comprise a turbocharger disposed upstream from the gas sensor, and the particulate filter can be close-coupled to the turbocharger. Systems for performing the disclosed methods are also provided.

Although many of the embodiments herein are described in relation to vehicles, the embodiments herein are generally suitable for cleaning gas sensors in various unrelated applications.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Generally, this disclosure pertains to methods for cleaning gas sensors, such as $O_2$ and NOx sensors. In particular, this disclosure pertains to cleaning the sampling orifices and proximate regions of gas sensors to remove exhaust gas deposits. Exhaust gas streams are generated, in some embodiments, by internal combustion engines (ICE) which can, for example, power a vehicle. Exhaust gas deposits can include particulate matter, carbonaceous soot, $NO_x$ species, exhaust gas liquids, and other species germane to exhaust gas. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$.

Figure 1:
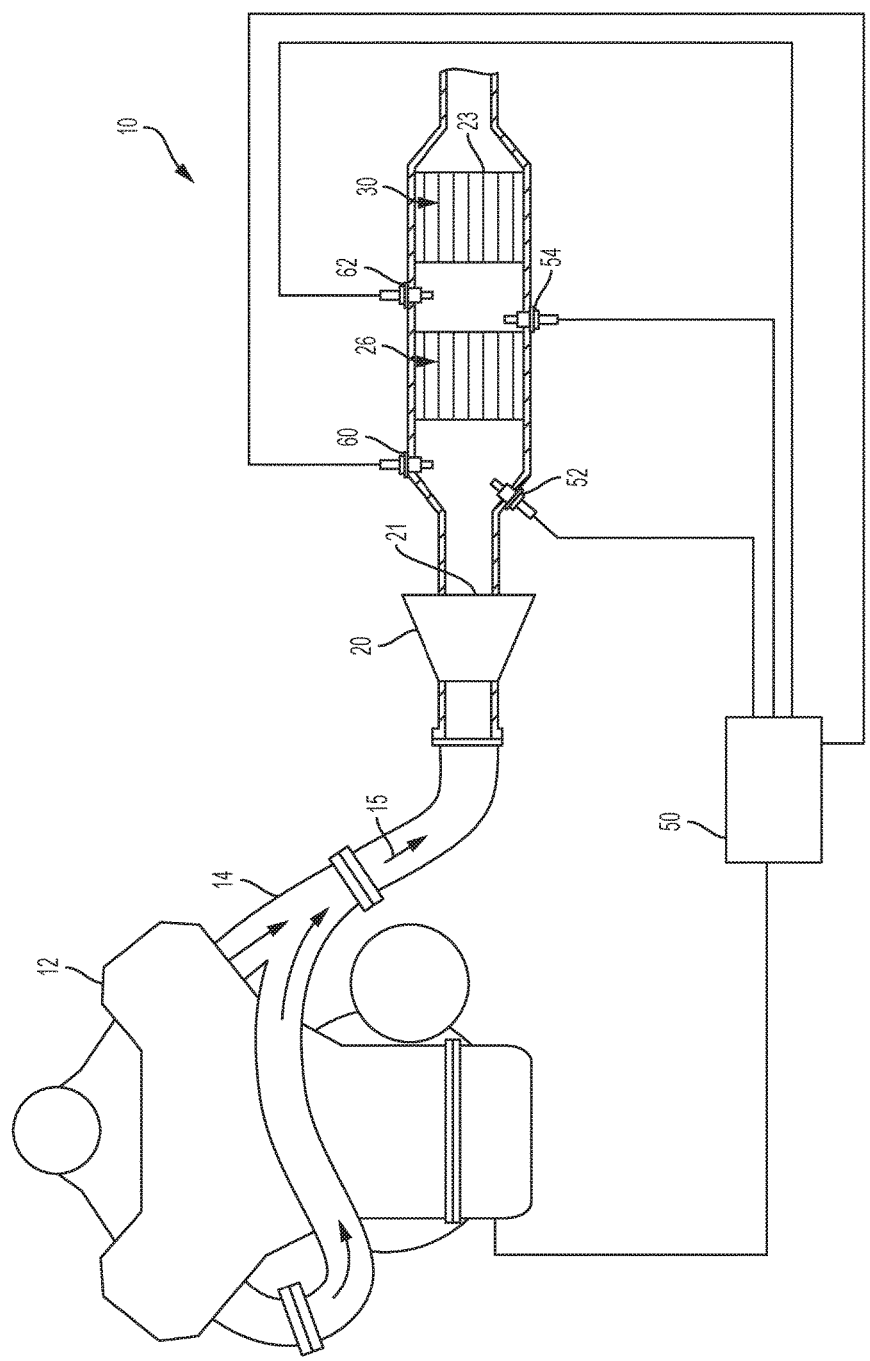
FIG. 1 illustrates an exhaust gas treatment system, according to one or more embodiments.

Gas sensors are commonly utilized in exhaust gas treatment systems. FIG. 1 illustrates an exhaust gas treatment system 10 for treating and/or monitoring the exhaust gas 15 constituents of an ICE 12. The exhaust gas treatment system 10 described herein can be implemented in various ICE systems that can include, but are not limited to, diesel engine systems, gasoline direct injection systems, and homogeneous charge compression ignition engine systems. The ICEs will be described herein for use in generating torque for vehicles, yet other non-vehicular applications are within the scope of this disclosure. Therefore when reference is made to a vehicle, such disclosure should be interpreted as applicable to any application of an ICE. Moreover, ICE 12 can generally represent any device capable of generating an exhaust gas stream 15 comprising gaseous (e.g., $NO_x$, $O_2$), carbonaceous, and/or particulate matter species, and the disclosure herein should accordingly be interpreted as applicable to all such devices. It should be further understood that the embodiments disclosed herein may be applicable to treatment of effluent streams not comprising carbonaceous and/or particulate matter species, and, in such instances, ICE 12 can also generally represent any device capable of generating an effluent stream comprising such species. For Example, ICE 12 can include a plurality of reciprocating pistons not shown attached to a crankshaft (not shown), which may be operably attached to a driveline, such as a vehicle driveline (not shown), to deliver tractive torque to the driveline. For example, ICE 12 can be any engine configuration or application, including various vehicular applications (e.g., automotive, marine and the like), as well as various non-vehicular applications (e.g., pumps, generators and the like).

The exhaust gas treatment system 10 generally includes one or more exhaust gas conduits 14, and one or more exhaust treatment devices. The exhaust gas conduit 14, which can comprise several segments, transports exhaust gas 15 from the ICE 12 to the various exhaust treatment devices of the exhaust gas treatment system 10. In some exemplary embodiments, exhaust gas 15 can comprise $NO_x$ species.

In the embodiment as illustrated, the exhaust gas treatment system 10 devices include an oxidation catalyst (OC) device 26, and a particulate filter device (PF) device 30. The implementation shown provides the PF device 30 in a common housing with the OC device 26, yet this implementation is optional and implementations providing discrete housings for the OC device 26 and PF device 30 are practicable and germane to this disclosure. The OC device 26 and PF device 30 can be downstream from a turbocharger 20. Further, the PF device 30 can be disposed upstream of the OC device 26 in some embodiments. As can be appreciated, the exhaust gas treatment system 10 of the present disclosure can include various combinations of one or more of the exhaust treatment devices shown in FIG. 1A, and/or other exhaust treatment devices (not shown), and is not limited to the present example. For example, the exhaust gas treatment system 10 can optionally include a selective catalytic reduction (SCR) device (not shown), a flow-through container of absorbent particles (not shown), an electrically heated catalyst (EHC) device (not shown), and combinations thereof. Exhaust gas treatment system 10 can further include a control module 50 operably connected via a number of sensors to monitor the engine 12 and/or the exhaust gas treatment system 10.

The control module 50 is operably connected to the engine 12 and/or various exhaust gas treatment system 10 components. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. The control module 50 can further be operably connected to the optional exhaust treatment devices described above. FIG. 1 illustrates the control module 50 in communication with two temperature sensors 52 and 54 located in the exhaust gas conduit 14. The first temperature sensor 52 is located upstream of the OC device 26 and PF device 30, and the second temperature sensor 54 is located downstream of the OC device 26 and PF device 30. The temperature sensors 52 and 54 send electrical signals to the control module 50 that each indicate the temperature in the exhaust gas conduit 14 in specific locations. The control module 50 is also in communication with two gas sensors 60 and 62 that are in fluid communication with the exhaust gas conduit 14. Specifically, the first upstream gas sensor 60 is located downstream of the ICE 12 and upstream of the OC device 26 and PF device 30 to detect a one or more gas species concentration levels. The second downstream $NO_x$ sensor 62 is located downstream of the OC device 26 and PF device 30 to detect one or more gas species concentration levels in the exhaust gas conduit 14 in specific locations.

Gas sensors 60 and 62 can be utilized to monitor the gaseous composition of the exhaust gas 15 and/or monitor the performance of various exhaust treatment devices. Gas sensors 60 and 62 can comprise $NO_x$ sensors, $O_2$ sensors, and the like. Gas sensors 60 and 62 include a sampling end disposed within the exhaust gas conduit 14 such that each is capable of contacting exhaust gas 15. Gas sensors 60 and 62 can optionally include a second end located outside of the exhaust gas conduit 14. A gas sensor sampling end includes one or more sampling orifices through which a gas sample (e.g., exhaust gas 15) can be collected and/or analyzed by internal sensing elements. Gas sensors 60 and 62 can be operatively connected to the control module 50 that can be configured to accomplish control within exhaust gas 15 in accordance with control methods and strategies described herein, among others.

The OC device 26 can include, for example, a flow-through metal or ceramic monolith substrate that can be packaged in a stainless steel shell or canister having an inlet and an outlet in fluid communication with exhaust gas conduit 14. The substrate can include an oxidation catalyst compound disposed thereon. The oxidation catalyst compound can be applied as a wash coat and can contain platinum group metals such as platinum (Pt), palladium (Pd), rhodium (Rh) or other metal oxide catalysts such as perovksites, or combination thereof. The OC device is useful in treating unburned gaseous and non-volatile unburned hydrocarbons and CO, which are oxidized to form carbon dioxide and water. In some embodiments an OC device, such as a diesel oxidation catalyst (DOC) device, can be positioned upstream of a SCR device to convert NO into $NO_2$ for preferential treatment in the SCR.

The PF device 30 can be disposed downstream of the OC device 26, as shown, or can be disposed upstream of the SCR device 26. For example only, the PF device 30 can include a diesel particulate filter (DPF). The PF device 30 operates to filter the exhaust gas 15 of carbon, soot, and other particulates. The PF device 30 includes a filter 23. In some embodiments, the PF device 30 can be constructed using a ceramic or SiC wall flow monolith filter 23 that can be packaged in a shell or canister constructed of, for example, stainless steel, and that has an inlet and an outlet in fluid communication with exhaust gas conduit 14. It is appreciated that the ceramic or SiC wall flow monolith filter is merely exemplary in nature and that the PF device 30 can include other filter devices such as wound or packed fiber filters, open cell foams, sintered metal fibers, etc. The ceramic or SiC wall flow monolith filter 23 can have a plurality of longitudinally extending passages that are defined by longitudinally extending walls. The passages include a subset of inlet passages that have an open inlet end and a closed outlet end, and a subset of outlet passages that have a closed inlet end and an open outlet end. Exhaust gas 15 entering the filter 23 through the inlet ends of the inlet passages is forced to migrate through adjacent longitudinally extending walls to the outlet passages. It is through this wall flow mechanism that the exhaust gas 15 is filtered of carbon and other particulates. The filtered particulates are deposited on the longitudinally extending walls of the inlet passages and, over time, will have the effect of increasing the exhaust gas 15 backpressure experienced by the IC engine 12.

During operation of exhaust gas treatment system 10, exhaust gas 15 species can accumulate on gas sensor 62 and/or 60 sampling ends and occlude or partially occlude the one or more sampling orifices located thereon. Accordingly, accurate sampling of exhaust gas 15 and/or the response times of gas sensors 60 and 62 are retarded or prevented.

Applying heat to exhaust gas deposits can cause the deposits to one or more of burn, and dislodge from a substrate, such as gas sensor 60 sampling end. In general, heating carbonaceous exhaust gas deposits to temperatures at least about 600° C. to about 650° C. can initiate soot burning. Soot burning can convert carbonaceous solids to gases such as carbon dioxide, for example, or effect a chemical or physical change in the soot or accumulated deposits such that the deposits disengage from the sensor. For the purposes of this disclosure, gas sensor cleaning comprises raising the temperature of exhaust gas 15 to at least 500° C., at least 525° C., or at least 550° C., wherein temperature is measured at the gas sensor. Where the gas system comprises a turbocharger, gas sensor cleaning comprises raising the temperature of exhaust gas 15 to at least 500° C., at least 525° C., or at least 550° C., wherein temperature is measured at the turbocharger 20 outlet 21.

Raising the exhaust gas 15 temperature can be accomplished by various methods, as known in the art. The exhaust gas 15 temperature can be raised by a post-injection strategy, and/or through use of a heating element proximate to the sensor. A heating element can comprise a glow plug, for example. A post-injection strategy is a modification of a normal ICE injection strategy. During the operation of an ICE, such as ICE 12, one or more pistons of the ICE perform four strokes within the one or more corresponding cylinders: an intake stroke, a compression stroke, a combustion stroke, and an exhaust stroke. During the intake stroke, the piston begins at, top dead center (TDC) and ends at bottom dead center (BDC). The cylinder intake valve achieves an open position to allow the piston to pull an air-fuel mixture into the cylinder by producing vacuum pressure into the cylinder through its downward motion. The compression stroke subsequently begins at BDC and ends at TDC. With the cylinder intake and exhaust valves are closed, the piston compresses the air-fuel mixture in preparation for ignition. During the subsequent combustion stroke, the piston is at TDC and the compressed air-fuel mixture is ignited by a spark plug (in a gasoline engine) or by the compression (diesel engines) achieved during the compression stroke. After ignition of the air-fuel mixture, the combustion forcefully returns the piston to BDC and translates mechanic work to an associated crankshaft. During the subsequent exhaust stroke, the piston returns from BDC to TDC with the exhaust valve in an open position in order to expel the spent air-fuel mixture into an exhaust gas system, such as exhaust gas treatment system 10. A post-injection strategy comprises injecting fuel into an engine cylinder after the air-fuel mixture is introduced into the cylinder during the intake stroke. Post-injection occurs during the combustion stroke, before the exhaust valves open during the exhaust stroke, and after the first air-fuel mixture has already combusted, or is combusting. More specifically, post-injection occurs while the piston is sufficiently near to TDC such that the post-injected fuel can substantially or completely combust within the cylinder. By introducing additional fuel into the cylinder, post-injection accordingly raises the temperature of the exhaust gas expelled from the cylinder.

Utilizing a post-injection strategy to clean a sensor can comprise running a post-injection strategy for a duration of time. Such durations will vary depending on the exhaust gas temperature achieved by the post-injection strategy, and the amount of deposits accumulated on the sensor. In some embodiments, a sensor is cleaned by running a post-injection strategy for about one minute. In some embodiments, a sensor is cleaned by running a post-injection strategy for longer than one minute.

Over time, filter devices such as PF device 30 can similarly accumulate particulate matter and must be regenerated. Accumulation of particular matter can degrade the efficiency of a PF device 30 and increase back pressure on an ICE 12, for example. Regeneration generally involves the oxidation or burning of the accumulated particulate matter in the PF device 30. For example, carbonaceous soot particulates can be oxidized during the regeneration process to produce gaseous carbon dioxide. One or more regeneration techniques can be implemented when a PF device 30 has accumulated a determined amount of particulate matter, for example. A determined amount of particulate matter can be set based on weight, percentage capacity of the PF device 30, or based on other factors, for example. One or more regeneration techniques can be implemented at random times, or at prescribed intervals. For example, a PF device 30 regeneration strategy can be implemented by the control module 50.

In many instances, regeneration comprises increasing exhaust gas 15 temperature. Increasing exhaust gas 15 temperature can be achieved by a number of methods, such as adjusting engine calibration parameters to implement a post-injection strategy as described above, adjusting engine calibration parameters to implement an after-injection strategy, utilizing an optional EHC device, and combinations thereof. In general, one or multiple regeneration strategies are utilized to regenerate a PF device 30, and such strategies can be implemented and/or optimized by module 50, for example. It should be appreciated that the above regeneration techniques are merely illustrative, and are not meant to preclude the use or suitability of other additional or alternative regeneration techniques.

An after-injection strategy introduces fuel to the exhaust gas treatment system 10 such that the fuel combusts and/or reacts with a catalytic component of the system 10 and increases the temperature of the exhaust gas 15. Specifically, an after-injection strategy comprises injecting fuel into an engine cylinder after the air-fuel mixture is introduced into the cylinder during the intake stroke. After-injection occurs during the combustion stroke and/or exhaust stroke, while the exhaust valve is open or just before the exhaust valve opens. More specifically, after-injection occurs while the piston is sufficiently far from TDC and/or after the first air-fuel mixture has already combusted such that the after-injected fuel does not combust within the cylinder. The after-injected fuel is expelled unburnt from the cylinder during the exhaust stroke and introduced to the exhaust gas system. When the after-injected fuel contacts the OC device 26, heat released during oxidation of the fuel is imparted to the exhaust gas treatment system 10 to clear the PF device 30 of some or all accumulated particulate matter.

It has been determined that PF device regeneration techniques utilizing one or more of post-injection strategies and EHC devices have little to no cleaning effect on gas sensors, particularly gas sensors located upstream from the DOC devices and EHC devices utilized in such regeneration techniques. However, it has been discovered that after-injected regeneration techniques are effective for both gas sensor and PF device cleaning/regeneration. Accordingly, provided herein are methods for optimizing PF device regeneration and gas sensor cleaning.

Figure 2:
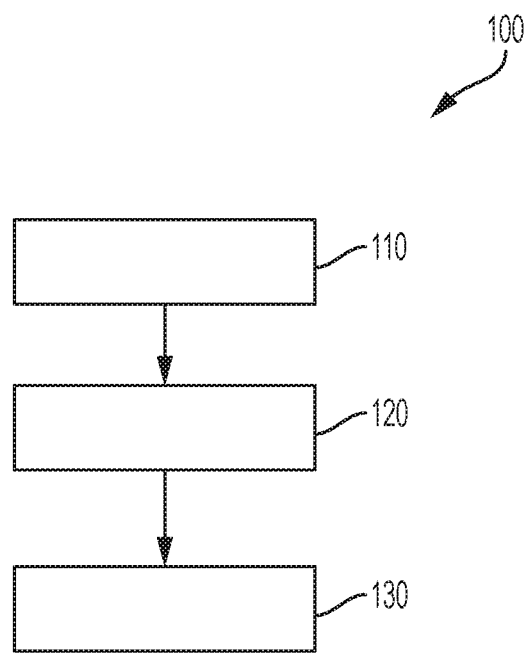
FIG. 2 illustrates a block diagram of a method for optimizing exhaust gas system regeneration and cleaning, according to one or more embodiments.

FIG. 2 illustrates a method 100 for optimizing exhaust gas system regeneration and cleaning, the method comprising detecting 110 a sensor malfunction, detecting 120 PF device soot loading, and performing 130 optimized maintenance. The exhaust gas system generally includes an exhaust gas source that provides an exhaust gas stream to one or more exhaust gas treatment devices via an exhaust gas conduit, and at least one gas sensor disposed within the exhaust gas conduit or one or more exhaust gas treatment devices. The at least one gas sensor can comprise an oxygen sensor, or a $NO_x$ sensor. The exhaust source can comprise an ICE, as described above. The one or more exhaust gas treatment devices can comprise a PE device, and an OC device disposed upstream from the PF device. The exhaust gas system can comprise a turbocharger, disposed upstream from the one or more exhaust gas treatment devices. The one or more treatment devices can be close-coupled to the turbocharger. A close-coupled treatment device can be within 1 meter of the engine turbocharger outlet, for example, wherein the distance is measured based upon the linear length of exhaust gas conduit. The at least one gas sensor can be disposed downstream from the turbocharger but upstream from the PF device. A gas sensor can be disposed upstream from the OC device. The exhaust gas system can comprise a second gas sensor disposed downstream from the OC device. The exhaust gas system can comprise system 10, for example.

Regarding method 100, no order is imposed on detecting 110 and detecting 120; each function can occur simultaneously and/or subsequently from the other. Detecting 110 a sensor malfunction can comprise inadequate performance of a gas sensor. Inadequate performance can include a reduced response time relative to a previous response time, and/or a response time which is above an acceptable threshold. For example, where a gas sensor provides a response every second, a response time of above 2 seconds, or above 2.25 seconds can be considered unacceptable. A response time can be defined as the amount of time measured between two consecutive measurements. The response time can be measured by a module, for example module 50, as the time elapsed between when two consecutive transmissions from the gas sensor are received by the module.

Detecting 120 PF device soot loading can comprise detecting an amount of soot accumulated in a PF device above an acceptable threshold. A threshold can be defined as an amount of soot accumulated in the PF device by weight, and/or a thickness of accumulated deposits, for example. Additionally or alternatively, a threshold can be defined as a maximum pressure drop across the PF device, wherein an increased pressure drop evidences an increased soot loading. Additionally or alternatively, a threshold level of reductant deposit can be predetermined via theoretical or empirical soot loading models which are implemented using current process variables from the exhaust gas system.

Performing 130 an optimized maintenance can comprise simultaneously cleaning a gas sensor and regenerating a PF device using at least one common technique. A common technique is one which is capable of cleaning a gas sensor and regenerating a PF device. A gas sensor can be cleaned by implementing a post-injection strategy, using a heating element proximate to the sensor, and combinations thereof. A PF device can be regenerated by implementing a post-injection strategy, implementing an after-injection strategy, utilizing an optional EHC device, and combinations thereof. Accordingly, implementing a post-injection strategy comprises a common technique. Where the exhaust gas system comprises a gas sensor disposed downstream from an OC device, an after-injection strategy can comprise a common technique. Method 100 can comprise implementing a plurality of common techniques, such as an after-injection strategy and a post-injection strategy.

In addition to utilizing at least one common technique, performing 130 an optimized maintenance can further comprise performing a second gas sensor cleaning technique. The second gas sensor cleaning technique can comprise activating a heating element proximate to the sensor. A second gas sensor cleaning technique can be utilized where the common technique sufficiently regenerates the PF device, but the gas sensor requires further cleaning. Where a second gas sensor cleaning technique is utilized, the cleaning routine can be optimized using a specific look-up table which utilizes deposit accumulation on the gas sensor and one or more of engine operating conditions and exhaust gas system conditions in order to prescribe target cleaning temperatures and/or durations.

In addition to utilizing at least one common technique, performing 130 an optimized maintenance can further comprise utilizing one or more PF device regeneration techniques. The second PF device regeneration technique can comprise utilizing an after-injection strategy, or utilizing an EHC device integrated with or proximate to the PF device. A second PF device regeneration technique can be utilized where the common technique sufficiently cleans the gas sensor, but the PF device requires further regeneration.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for cleaning a gas sensor used in an exhaust gas system including an exhaust gas stream supplied by an exhaust gas source to a particulate filter device through an exhaust gas conduit, and a gas sensor having a sampling end disposed within the exhaust gas conduit upstream from the particulate filter device, the method comprising:
   detecting a gas sensor malfunction;
   detecting a particulate filter device soot loading above an acceptable threshold; and
   performing an optimized maintenance utilizing a first common technique to clean the gas sensor and regenerate the particulate filter device.

2. The method of claim 1, wherein the exhaust gas source comprises an internal combustion engine and the first common technique comprises a post-injection strategy.

3. The method of claim 1, wherein the exhaust gas system further comprises a turbocharger disposed upstream from the gas sensor.

4. The method of claim 3, wherein the particulate filter device is close-coupled to the turbocharger.

5. The method of claim 1, further comprising a performing a second gas sensor cleaning technique.

6. The method of claim 5, wherein the second gas sensor cleaning technique is optimized using a look-up table which utilizes deposit accumulation on the gas sensor and one or more of engine operating conditions and exhaust gas system conditions in order to prescribe one or more of cleaning temperature and cleaning duration.

7. The method of claim 1, further comprising a performing a second particulate filter device regeneration technique.

8. The method of claim 1, wherein the exhaust gas system comprises an oxidation catalyst device disposed upstream from the particulate filter device and a second gas sensor disposed between the particulate filter device and the oxidation catalyst device.

9. The method of claim 8, wherein the exhaust gas source comprises an internal combustion engine and the first common technique comprises one or more of a post-injection strategy and an after-injection strategy.

10. The method of claim 1, wherein detecting a gas sensor malfunction comprises detecting a gas sensor response time which is above a threshold.

11. The method of claim 10, wherein the threshold comprises 2.25 seconds.

12. The method of claim 1, wherein detecting particulate filter soot loading comprises detecting an accumulated amount of soot using a soot loading model.

13. The method of claim 1, wherein detecting particulate filter soot loading comprises detecting a pressure drop across the particulate filter device which is above a threshold.

14. The method of claim 1, wherein the first common technique raises the temperature of the exhaust gas to at least 500° C.

15. The method of claim 1, wherein sensor malfunction is caused by exhaust gas species accumulating on the sampling end of the exhaust gas sensor.

16. The method of claim 1, wherein the exhaust gas source is an internal combustion engine configured to power a vehicle.

17. A method for cleaning a gas sensor used in an exhaust gas system including an exhaust gas stream supplied by an exhaust gas source via an exhaust gas conduit to an oxidation catalyst device and a particulate filter device disposed downstream from the oxidation catalyst device, and a gas sensor having a sampling end disposed within the exhaust gas conduit upstream from the particulate filter device and downstream from the oxidation catalyst device, the method comprising:

detecting a gas sensor malfunction;
 detecting a particulate filter device soot loading above an acceptable threshold; and
 performing an optimized maintenance utilizing a first common technique to clean the gas sensor and regenerate the particulate filter device.

18. The method of claim 17, wherein the exhaust gas source comprises an internal combustion engine and the first common technique comprises one or more of a post-injection strategy and an after-injection strategy.

19. The method of claim 17, wherein the exhaust gas system further comprises a turbocharger disposed upstream from the gas sensor and the particulate filter device is close-coupled to the turbocharger.

20. The method of claim 17, wherein detecting a gas sensor malfunction comprises detecting a gas sensor response time which is above a threshold.

* * * * *